United States Patent
Waddell et al.

(10) Patent No.: US 6,710,116 B1
(45) Date of Patent: Mar. 23, 2004

(54) ABRASION RESISTANT TRANSPARENT AND COLORABLE ELASTOMERIC COMPOSITIONS

(75) Inventors: Walter Harvey Waddell, Pasadena, TX (US); Robert Ryan Poulter, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/691,764

(22) Filed: Oct. 18, 2000

(51) Int. Cl.$^7$ .............................................. C08L 27/00
(52) U.S. Cl. ...................... 524/515; 524/519; 524/567; 524/578; 152/525
(58) Field of Search ................................. 524/515, 519, 524/567, 578; 152/525

(56) References Cited

U.S. PATENT DOCUMENTS

| | | | |
|---|---|---|---|
| 2,631,984 A | 3/1953 | Crawford et al. ............... 260/5 |
| 3,099,644 A | 7/1963 | Parker et al. ............... 260/85.3 |
| 3,898,253 A | 8/1975 | Buckler et al. ............ 260/42.7 |
| 3,981,342 A | 9/1976 | Farber et al. ............... 152/347 |
| 4,057,090 A | 11/1977 | Hoshikawa et al. ........ 152/347 |
| 4,090,546 A | 5/1978 | Honda et al. ............... 152/347 |
| 4,279,284 A | 7/1981 | Spadone ..................... 152/330 |
| 4,395,506 A | 7/1983 | Nagano et al. ............... 524/68 |
| 4,502,520 A | 3/1985 | Sandstrom ................... 152/330 |
| 4,616,686 A | 10/1986 | Berta .......................... 152/510 |
| 4,632,963 A | 12/1986 | Gardner et al. ........... 525/332.3 |
| 4,681,921 A | 7/1987 | Gardner et al. ............. 525/357 |
| 4,703,091 A | 10/1987 | Gardner et al. ......... 525/332.3 |
| 4,754,793 A | 7/1988 | Mohammed ................ 152/510 |
| 4,978,714 A | 12/1990 | Bayan et al. .................. 525/69 |
| 5,005,625 A | 4/1991 | Klemmensen et al. ...... 152/510 |
| 5,013,793 A | 5/1991 | Wang et al. ................. 525/195 |
| 5,040,583 A | 8/1991 | Lin et al. ..................... 152/510 |
| 5,071,913 A | 12/1991 | Powers et al. ................ 525/87 |
| 5,120,379 A | * 6/1992 | Noda et al. .................. 156/107 |
| 5,156,921 A | 10/1992 | Lin et al. ..................... 428/521 |
| 5,162,409 A | 11/1992 | Mroczkowski .............. 524/262 |
| 5,178,702 A | 1/1993 | Frerking, Jr. et al. ....... 152/510 |
| 5,182,333 A | 1/1993 | Powers et al. ............... 525/315 |
| 5,234,987 A | 8/1993 | Hubbard et al. ............. 524/505 |
| 5,242,727 A | 9/1993 | Briddell et al. ................ 428/42 |
| 5,286,804 A | 2/1994 | Powers et al. ............ 525/333.4 |
| 5,292,590 A | 3/1994 | Lin et al. ..................... 428/494 |
| 5,397,832 A | 3/1995 | Ellul ........................... 525/515 |
| 5,491,196 A | 2/1996 | Beers et al. .................. 525/237 |
| 5,631,316 A | 5/1997 | Costemalle et al. ......... 524/521 |
| 5,670,577 A | 9/1997 | Dawson, Jr. .................. 525/95 |
| 5,733,621 A | 3/1998 | Cotsakis et al. ............. 428/42.3 |
| 5,755,899 A | 5/1998 | Hecker et al. ............... 152/510 |
| 5,922,153 A | 7/1999 | Beers et al. .................. 152/510 |
| 5,925,702 A | 7/1999 | Hecker et al. ............... 524/449 |
| 5,964,969 A | 10/1999 | Sandstrom et al. .......... 152/524 |
| 6,014,998 A | 1/2000 | Mowdood et al. ........... 152/564 |
| 6,228,978 B1 | 5/2001 | Agarwal et al. .............. 528/363 |
| 6,255,389 B1 | 7/2001 | Ouhadi et al. ................ 525/76 |
| 6,326,433 B1 | 12/2001 | Wang et al. .................. 525/191 |

FOREIGN PATENT DOCUMENTS

| | | | |
|---|---|---|---|
| EP | 0 102 844 A2 | 3/1984 | |
| EP | 0 127 998 A2 | 12/1984 | |
| EP | 0 296 332 B1 | 12/1988 | |
| EP | 0 314 416 A2 | 5/1989 | |
| EP | 0 320 263 B1 | 6/1989 | |
| EP | 0 376 558 B1 | 7/1990 | |
| EP | 0 682 071 B1 | 7/1997 | |
| EP | 0 823 454 B1 | 2/1998 | |
| EP | 0 930 335 A | 7/1999 | |
| EP | 0 931 815 B1 | 7/1999 | |
| GB | 2299337 | 10/1996 | .......... C09J/115/00 |
| JP | 5179068 | 7/1993 | |
| JP | 11005874 A | 1/1999 | |
| WO | WO 87/05310 | 9/1987 | |
| WO | WO 92/16587 | 10/1992 | |
| WO | WO 94/01295 A | 1/1994 | |
| WO | WO97/14748 | 4/1997 | .......... C08K/13/02 |
| WO | WO98/53000 | 11/1998 | ............ C08K/3/34 |
| WO | WO 99/02601 | 1/1999 | |
| WO | WO 99/31178 | 6/1999 | |

OTHER PUBLICATIONS

E. Kresge, et al.; "Butyl Rubber"; Kirk–Othmer Encycl. of Chem. Techn.—4th Ed., vol. 8, pp. 934–955; © 1993 by John Wiley & Sons.
"Rubber Compounding":Kirk–Othmer Encycl. of Chem. Techn.—3rd Ed., vol. 20; pp. 384–390; © 1982 John Wiley & Sons.
Japanese Abstract—No. 25380 (Jan. 27, 1998), Y. Minagawa, et al.
USSN 09/592,757.
*The Post Vulcanization Stabilization for NR*, W.F. Helt, B.H. To & W.W. Paris, Rubber World, Aug. 1991, pp. 18–23.
*Formulation Design and Curing Characteristics of NBR Mixes for Seals*, Rubber World, Sep. 1993, pp. 25.30.
JP Abstract for JO–3028–244–A, Publication date of Feb. 6, 1991.
Ash, Michael; *Handbook of Plastic Compounds, Elastomers, and Resins*, VCH Publishers, Inc., pp. 216–217, © 1992, New York, NY.
*Synthetic Lubricants and High–Performance Functional Fluids*, Marcel Dekker, Inc., pp. 357–392, © 1999.

* cited by examiner

Primary Examiner—Peter D. Mulcahy
(74) Attorney, Agent, or Firm—Kevin M. Faulkner; Leandro Arechederra

(57) ABSTRACT

Transparent and colorable elastomeric compositions are provided. The transparent elastomeric compositions can be covulcanized with rubbers such as polybutadiene, polyisoprene, styrene-butadiene rubber, styrene-isoprene-butadiene rubber, isoprene-butadiene rubber, ethylene-propylene diene rubber or natural rubber and a processing aid. The colorable rubber compositions have sufficient properties to function as a reinforcing member in a shoe sole or automobile tire. Preferably, both the transparent and colorable elastomeric compositions include at least one copolymer of a $C_4$ to $C_7$ isoolefin and a para-alkylstyrene, silica and a high cis-polybutadiene rubber.

52 Claims, No Drawings

ABRASION RESISTANT TRANSPARENT AND COLORABLE ELASTOMERIC COMPOSITIONS

FIELD OF THE INVENTION

The present invention relates to transparent and colorable elastomeric compositions and, more particularly, to transparent and colorable elastomeric compositions that can be used in reinforcing applications having a high abrasion resistance and traction.

BACKGROUND OF THE INVENTION

Rubber compositions are used in a variety of applications, including tire components such as treads and sidewalls, hoses, belts, footwear components, vibration isolation devices and bladders. While the particular rubber compositions used in each of these applications vary widely in their physical properties, one attribute remains the same—their color. Most rubber compositions are black. Furthermore, most rubber compositions eventually become discolored due to heat, light, ozone, etc. This is particularly true for rubbers used in stressful, demanding applications such as tire treads and sidewalls.

Practitioners in this field will point to the presence of the reinforcing filler "carbon black" as a prime reason that most rubbers are black. While this is true, carbon black is not the only factor. In fact, a wide variety of other fillers, curatives, antidegradants, oils and the rubbers themselves can all result in a dark color that is essentially impossible to pigment. This is evident in compositions where carbon black has been replaced with a silica filler and the rubber is still discolored. For example, European Patent 0 682 071 B1 discloses a silica reinforced tire tread which, due to the presence of the aromatic processing aid, coupling agent, antidegradants and a sulfur curative system, will still be dark in color. In fact, it is uncertain how many of the ingredients present in the rubber composition would have to be changed to produce a colorable composition.

There are some colorable and transparent elastomeric compositions that are currently used. For example, clear EPDM elastomers are available. However, these elastomers do not covulcanize with other rubbers. Since many rubber applications involve combining several types of rubber to form a single article (i.e. tires), these EPDM elastomers are limited in their usefulness. A related patent, serial number 09/592,757 (assigned to the assignee of the present invention), discloses improved blends of rubbers and other elastomers with silica to form transparent elastomeric materials. However, these materials may not be suitable for applications requiring high abrasion resistance while maintaining the colorability of the composition. Such is the case for, example, tire sidewalls and shoe soles.

White sidewalls on tires are a form of colorable rubber. The white color is achieved by using fillers such as silica, clay, talc and carbonates instead of carbon black and adding titanium dioxide as a whitening pigment. However, the white color comes with a price. The fillers are more fragile than carbon black and result in a weak rubber composition that does not reinforce the tire.

In applications such as shoe soles and tire treads where a large amount of a filler such as silica is used, it is desirable to maintain and adequately adjust certain physical properties such as the processability of the rubber, the cure rate, and final cure characteristics such as traction and abrasion resistance. In particular, abrasion resistance is important for colorable rubber compositions in, for example, tire sidewalls where there is a need for resistance to curb-scuffing. Also, in shoe soles and other shoe applications there is a need for an elastomeric composition that has long wear. An object of the present invention it to provide a colorable elastomeric composition that has improved abrasion resistance and other improved physical characteristics, while maintaining the colorability and transparency of the composition.

SUMMARY OF THE INVENTION

The present invention provides improved transparent and colorable elastomeric compositions. The transparent elastomeric compositions are halogenated isoolefin/para-alkylstyrene elastomers which can be alone in the composition or can be covulcanized with rubbers such as polybutadiene, polyisoprene, styrene-butadiene rubber, styrene-isoprene-butadiene rubber, isoprene-butadiene rubber, ethylene-propylene diene rubber, high cis-polybutadiene or natural rubber. The colorable rubber compositions have sufficient properties to function as a reinforcing member in an automobile tire or sufficient traction and abrasion resistance to function as a shoe sole. Preferably, both the transparent and colorable elastomeric compositions include at least one copolymer of a $C_4$ to $C_7$ isoolefin and a para-alkylstyrene, silica, a coupling agent, and a processing aid such as a low molecular weight saturated polymer.

The "elastomeric composition" of the present invention is a mixture of at least the halogenated isoolefin/para-alkylstyrene, a filler agent (described below), and the processing aid (described below). The elastomeric composition may also contain other rubbers as listed above, as well as a cure system when another rubber is present.

The elastomeric compositions of the present invention are useful in a variety of applications, particularly pneumatic tire components, hoses, belts, solid tires, footwear components, rollers for graphic arts applications, vibration isolation devices, pharmaceutical devices, adhesives, sealants, protective coatings and bladders for fluid retention and curing purposes.

DETAILED DESCRIPTION OF THE INVENTION

The present invention is an elastomeric composition comprising a copolymer of a $C_4$ to $C_7$ isoolefin and a para-alkylstyrene, a filler; and a low molecular weight, saturated processing aid. The composition may also comprise a rubber selected from the group consisting of polybutadiene, polyisoprene, styrene-butadiene rubber, styrene-isoprene-butadiene rubber, Isoprene-butadiene rubber, ethylene-propylene diene rubber, high cis-polybutadiene or blends thereof.

The colorable elastomeric compositions of the present invention have sufficient properties to function as shoe soles and other shoe components and as a reinforcing member in an automobile tire, as well as other applications where a colorable, transparent material is desired. The colorable elastomeric compositions of the present invention are useful in making colored elastomeric products capable of meeting current performance requirements. These colorable compounds were produced by replacing carbon black filler with a non-staining mineral filler such as, but not limited to, fumed or precipitated silicas, clays, talcs, calcium carbonates, aluminum oxides, titanium oxides, and zinc oxides. The mineral filler must reinforce the polymer system and not inhibit pigmentation to be effective. In addition, the remaining components of the colorable compound were selected on the basis that they will not interfere with the colorable nature of the elastomer. The cured, colorable compounds of the present invention still have the same dynamic and physical properties that meet the performance demands of current black-colored tire treads.

All components of the transparent and colorable elastomeric compositions must be carefully selected so that they will not interfere with the transparency and/or colorability of the composition. For example, the elastomers, fillers, processing aids, antidegradants and curatives should not discolor the composition during the formation of the elastomeric composition. Furthermore, the components should not discolor the elastomeric composition as a result of exposure to light (including UV), heat, oxygen, ozone and strain.

In one embodiment of the present invention, an elastomeric composition is produced which exhibits transparent properties. The term "transparent", as used herein is defined as transmission of light without substantial scattering such that visual identification can be made of objects behind the elastomeric composition. Degrees of transparency can vary from contact transparency to complete transparency. However, other embodiments of the invention are not limited to transparent compositions, such as those blended for tire treads.

Isoolefin and Para-alkylstyrene Copolymer

Preferably, the elastomeric composition contains at least one copolymer of a $C_4$ to $C_7$ isoolefin and a para-alkylstyrene. Preferably, the $C_4$ to $C_7$ isoolefin is isobutylene. In addition, the para-alkylstyrene is preferably para-methylstyrene. Most preferably, the copolymer is a terpolymer of isobutylene, para-methylstyrene and bromo para-methylstyrene. The copolymer used in the transparent elastomeric compositions of the present invention is preferably a terpolymer of isobutylene, para-methylstyrene and bromo para-methylstyrene (BrPMS). In addition, this terpolymer preferably composes from 10 to 100 phr of the transparent elastomeric composition. More preferably, the terpolymer composes from 30 to 80 phr of the transparent elastomeric composition. More preferably, the terpolymer composes from 20 to 50 phr of the composition. Preferred commercial examples of such terpolymers are EXXPRO™ Elastomers (ExxonMobil Chemical Company).

The copolymer of a $C_4$ to $C_7$ isoolefin and a para-alkylstyrene of the present invention also encompasses terpolymers of a $C_4$ to $C_7$ isoolefin, para-alkylstyrene and halogenated para-alkylstyrene. The percentages of para-alkylstyrene and halogenation can vary widely. Different applications may require dramatically different formulations. Generally, the copolymer of the present invention will have from 2 wt. % to 20 wt. % para-alkylstyrene (preferably para-methylstyrene). In addition, the copolymer of the present invention will have from 0.20 mol % to 3.0 mol % of a halogenated compound, such as bromo para-methylstyrene.

Preferably, low levels of either bromine and/or para-alkylstyrene are used. In a preferred embodiment, para-alkylstyrene (preferably para-methylstyrene) comprises from 5 wt. % to 15 wt. % of the copolymer. More preferably, it is from 5 wt. % to 7.5 wt. % of the copolymer. In another preferred embodiment, a halogenated compound, such as bromo para-methylstyrene comprises from 0.20 mol % to 3.0 mol % of the copolymer. More preferably, it comprises from 0.50 mol % to 1.5 mol % of the copolymer. Most preferably, it is from 0.5 mol % to 1.0 mol % of the copolymer.

Filler

The elastomeric composition also contains a filler. The transparent elastomer compositions of the present invention do not contain carbon black. The transparent feature of the composition is obtained in part by using fillers to composing from 10 to 100 parts, per hundred parts of rubber (phr), of the composition which are finer than the wavelength of visible light. Silica is preferred as the filler, however other non-black fillers such as clays, talcs and other mineral fillers may be used. Silica may also be used to such an extent that the composition is no longer transparent or colorable.

The colorable compositions of the present invention are produced by replacing carbon black filler with a non-staining mineral filler such as, but not limited to, fumed or precipitated silicas, clays, talcs, calcium carbonates, aluminum oxides, titanium oxides, and zinc oxides. The preferred filler is silica present in the composition from 10 to 100 phr. The silica used in the transparent elastomeric compositions of the present invention is preferably a mixture of fumed and precipitated silicas. Also, the precipitated silica preferably composes from 30 to 80 parts of the transparent elastomeric composition. More preferably, it composes from 40 to 70 parts. The coupling agent used in the transparent elastomeric compositions of the present invention is preferably an organosilane-coupling agent. Preferably, the organosilane-coupling agent composes from 2 to 15 weight percent, based on the weight of silica, of the transparent elastomeric composition. More preferably, it composes from 4 to 12 weight percent of the composition.

The fillers of the present invention may be any size and typically range, e.g., in the tire industry, from about 0.0001 to about 100 microns. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

One or more coupling agents are preferably used in the elastomeric compositions of the present invention. More preferably, the coupling agent is a bifunctional organosilane cross-linking agent. By an "organosilane cross-linking agent" is meant any silane coupled filler and/or cross linking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In a preferred embodiment, bis-(3(triethoxysilyl)-propyl)-tetrasulfane (sold commercially as Si69 by Degussa) is employed.

Processing Aid

A processing aid is also present in the composition of the invention. The aid is present from 2–30 phr, more preferably from 5–20 phr, and most preferably from 10–20 phr. A typical processing aid is one that will enhance the transparent or colorable nature of the elastomeric composition. Some commercial examples of processing aids are SUNDEX™ (Sun Chemicals) and FLEXON™ (ExxonMobil Chemical). Preferably, the processing aid does not contain aromatic or unsaturation. Processing aids include, but are not limited to, plasticizers, tackifiers, extenders, chemical conditioners, homogenizing agents and peptizers such as mercaptans, petroleum and vulcanized vegetable oils, waxes, resins, rosins, and the like. The preferred processing aid is a low molecular weight, saturated polymer such as polybutene. Commercial examples of such a processing aid are the PARAPOL™ Series of processing aids, such as PARAPOL™ 950 and PARAPOL™ 2500, both from ExxonMobil Chemical Company (Also sold under the name INFINEUM™ C9925 and INFINEUM™ C9995 by Infineum International Limited).

More specifically, the PARAPOL™ Series processing aids are polymers of isobutylene and butene, each individual formulation having a small range of molecular weights for each formulation, all of which can be used in the composition of the invention. The molecular weights of the PARAPOL™ processing aids are from 420 MN (PARAPOL™ 450) to 2700 MN (PARAPOL™ 2500). The viscosity of, for example, of PARAPOL™ 950 is 230 cSt at 100° C., while the viscosity of PARAPOL™ 2500 is 4400 cSt at 100° C. The density (g/mL) of PARAPOL™ processing aids varies from about 0.85 (PARAPOL™ 450) to 0.91 (PARAPOL™ 2500). The bromine number (CG/G) for PARAPOL™ processing aids ranges from 40 for the 450 MN processing aid, to 8 for the 2700 MN processing aid. In the composition of the invention, the amount of the processing aid can be varied as well as the molecular weight (and hence, level of viscosity) of the processing aid. Thus, PARAPOL™ 450 can be used when low viscosity is desired in the composition, while PARAPOL™ 2500 can be used when a higher viscosity is desired. In this manner, the physical properties of the elastomeric composition can be controlled.

Additional Rubber Component

Another rubber component may also be present in the elastomeric composition of the invention. The rubber may compose from 0 to 90 phr, preferably from 20 to 80 phr. The transparent elastomeric compositions of the present invention are halogenated isoolefin/para-alkylstyrene terpolymers that can be covulcanized with polybutadiene, polyisoprene, styrene-butadiene rubber, styrene-isoprene-butadiene rubber, isoprene-butadiene rubber, ethylene-propylene diene rubber, high cis-polybutadiene or natural rubber. Some commercial examples of rubbers are NATSYN™ (Goodyear Chemical Company), natural rubber (SMR 20), and BUDENE™ 1207 or BR 1207 (Goodyear Chemical Company). The preferable covulcanate is high cis-polybutadiene (BR). By "cis-polybutadiene" or "high cis-polybutadiene", it is meant that 1, 4-cis polybutadiene is used, wherein the amount of cis component is at least 95%. An example of high cis-polybutadiene commercial products used in the covulcanized composition BR 1207.

In a preferred embodiment, the transparent elastomeric compositions of the present invention contains from 10 to 100 phr, of the copolymer of a $C_4$ to $C_7$ isoolefin and a para-alkylstyrene; from 10 to 100 phr of silica; from 0 to 20 weight percent based on the weight of the silica of a coupling agent; and 2–30 phr of a processing aid (discussed further below). Preferably, the colorable or transparent elastomeric compositions will also contain from 10 to 90 phr of polybutadiene, polyisoprene, styrene-butadiene rubber, styrene-isoprene-butadiene rubber, isoprene-butadiene rubber, ethylene-propylene diene rubber, high cis-polybutadiene or blends thereof. More preferably, the transparent elastomeric compositions will contain from 20 to 80 phr of polybutadiene, polyisoprene, styrene-butadiene rubber, styrene-isoprene-butadiene rubber, isoprene-butadiene rubber, ethylene-propylene diene rubber, high cis-polybutadiene or blends thereof.

Crosslinkers and Accelerators

The compositions produced in accordance with the present invention typically contain other components and additives customarily used in rubber mixes, such as effective amounts of other nondiscolored and nondiscoloring processing aids, pigments, accelerators, cross-linking and curing materials, antioxidants, antiozonants, fillers and naphthenic, aromatic or paraffinic extender oils if the presence of an extension oil is desired. Accelerators include amines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used.

Generally, polymer blends, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., *The Post Vulcanization Stabilization for NR*, W. F. Helt, B. H. To & W. W. Paris, *Rubber World*, August 1991, pp. 18–23 which is incorporated by reference herein.) Generally, polymer blends may be crosslinked by adding curative molecules, for example sulfur, metal oxides (i.e., zinc oxide), organometallic compounds, radical initiators, etc. followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex and either a sulfur compound or an alkylperoxide compound. (See also, *Formulation Design and Curing Characteristics of NBR Mixes for Seals, Rubber World*, September 1993, pp. 25–30 which is incorporated by reference herein). This method may be accelerated and is often used for the vulcanization of elastomer blends.

The acceleration of the cure process is accomplished by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK HTS by Flexsys), 2-(morpholinothio) benzothiazole (MBS or MOR), blends of 90% MOR and 10% MBTS (MOR 90), and N-oxydiethylene thiocarbamyl-N-oxydiethylene sulfonamide (OTOS) zinc 2-ethyl hexanoate (ZEH), N, N'-diethyl thiourea (thiourea) (sold commercially as Thiate U by R. T. Vanderbilt).

The present invention provides improved elastomeric compositions comprising a copolymer of a $C_4$ to $C_7$ isoolefin and a para-alkylstyrene, silica, a processing aid, and optionally, one or more coupling agents. In order to improve certain physical properties of the composition, another rubber is also present. These compositions exhibit improved properties including improved abrasion resistance, reduced cut growth, improved adhesion, reduced heat build-up, and retention of mechanical properties during severe heat build-up conditions such as those experienced in "run-flat" tires and engine mounts for transportation vehicles. The substantially isoolefin (isobutylene) backbone elastomer is a key element in that it imparts a self-limiting heat build-up. At lower temperatures, these elastomers exhibit high damping behavior which dissipates mechanical energy in the form of heat. However, as the elastomer heats up, the damping behavior diminishes and the behavior of the elastomer in more elastic and less dissipative.

The materials are mixed by conventional means known to those skilled in the art, in a single step or in stages. For example, the elastomers of this invention can be processed in one step. In a preferred embodiment, the silica and silane are added in a different stage from zinc oxide and other cure activators and accelerators. In a more preferred embodiment, antioxidants, antiozonants and processing materials are added in a stage after silica and silane have been processed with the rubber, and zinc oxide is added at a final stage to maximize compound modulus. Thus, a two to three (or more) stage processing sequence is preferred. Additional stages may involve incremental additions of filler and processing aids.

INDUSTRIAL UTILITY

The elastomeric compositions of the present invention are not only capable of being transparent or colorable, but can be covulcanized with other rubbers. The transparency will depend upon the amount of filler used. This results in an elastomer that can be used in wide variety of applications outside of the uses for known elastomers. The elastomeric compositions of the present invention are useful in a variety of applications, particularly pneumatic tire components, hoses, belts, solid tires, footwear components, rollers for graphic arts applications, vibration isolation devices, pharmaceutical devices, adhesives, sealants, protective coatings and bladders for fluid retention and curing purposes. In particular, the elastomeric compositions of the present invention can be used in shoe soles and tires.

The colorable elastomeric compositions of the present invention exhibit improved hysteretic properties, traction, heat stability and retention of properties upon aging to known colorable elastomers. This results in colorable rubber compositions which have sufficient properties to function as a reinforcing member in an automobile tire. The colorable rubber will allow a manufacturer to produce a tire with improved product appearance.

Below are examples of various compositions and methods of forming the composition of the invention. The following examples are by no means meant to be limiting of the invention, but are representative only. Cure properties were measured using a MDR 2000 at the indicated temperature and 0.5 degree arc. Test specimens were cured at the indicated temperature, typically from 150° C. to 160° C., for a time corresponding to T90+ appropriate mold lag. When possible, standard ASTM tests were used to determine the cured compound physical properties. Stress/strain properties (tensile strength, elongation at break, modulus values, energy to break) were measured at room temperature using an Instron 4202. Shore A hardness was measured at room temperature by using a Zwick Duromatic. Abrasion loss was determined at room temperature by weight difference by using an APH-40 Abrasion Tester with rotating sample holder (5 N counter balance) and rotating drum. Weight losses were indexed to that of the standard DIN compound with lower losses indicative of a higher abrasion resistance index.

Dynamic properties (G*, G', G" and tangent delta) were determined using a MTS 831 mechanical spectrometer for pure shear specimens (double lap shear geometry) at temperatures of −20° C., 0° C. and 60° C. using a 1 Hz frequency at 0. 1, 2 and 10% strains. Temperature-dependent (−80° C. to 60° C.) dynamic properties were obtained using a Rheometrics ARES at Sid Richardson Carbon Company, Fort Worth, Tex. and at ExxonMobil Chemical, Baytown, Tex. A rectangular torsion sample geometry was tested at 1 Hz and appropriate strain. Values of G" or tangent delta measured at 0° C. in laboratory dynamic testing can be used as predictors of tire traction for carbon black-filled BR/sSBR (styrene-butadiene rubber) compounds. Temperature-dependent (−90° C. to 60° C.) high-frequency acoustic measurements were performed at Sid Richardson Carbon Company using a frequency of 1 MHz and ethanol as the fluid medium.

EXAMPLES

Example 1

Experiments were conducted to produce transparent elastomers. Masterbatches of EXXPRO™ Elastomers (a terpolymer of isobutylene, para-methylstyrene and bromo para-methylstyrene, commercially available from ExxonMobil Chemical Company) of varying bromination level, comonomer content, and molecular weight were prepared. The copolymers had the properties listed in Table 1.

TABLE 1

Properties of the Copolymers

| PROPERTY | TERPOLYMER | | |
|---|---|---|---|
| | EXXPRO ™ 97-2 | EXXPRO ™ 89-1 | EXXPRO ™ 90-10 |
| Para-methylstyrene (wt. %) | 10 | 5.0 | 7.5 |
| Bromo para-methylstyrene (mol %) | 0.98 | 0.75 | 1.20 |
| Mooney Viscosity (ML(1 + 8)125° C.) | 45 ± 5 | 38 ± 5 | 45 ± 5 |

Test compositions were compounded to blend the masterbatch components and the cure additives listed in Table 2. FLEXON™ 785 is a naphthenic petroleum oil. DIAK #1 is hexamethylene diamine carbonate, available from Du Pont/Dow elastomers. DPG is diphenylguanidine.

TABLE 2

Formulations of Test Compositions A–F

| RECIPES | A | B | C | D | E | F |
|---|---|---|---|---|---|---|
| Master Batch (phr) | | | | | | |
| EXXPRO ™ 89-1 | 100 | 100 | 100 | | | |
| EXXPRO ™ 97-2 | | | | 100 | 100 | 100 |
| HISIL 233 | 45 | 45 | 45 | 45 | 45 | 45 |
| FLEXON ™ 785 | 14 | 14 | 14 | 14 | 14 | 14 |
| DIAK #1 | 3 | 4 | 4 | 3 | 4 | 4 |
| DPG | 3 | 2 | 3 | 3 | 2 | 3 |

The test compositions (A through F) were tested for cure characteristics, hardness and tensile strength. The values "MH" and "ML" used here and throughout the description refer to "maximum torque" and "minimum torque", respectively. The "MS" value is the Mooney scorch value, the "ML(1+4)" value is the Mooney viscosity value. The values of "T" are cure times in minutes, and "Ts" is scorch time". The results are presented in Table 3. The test compositions A-F demonstrated contact transparency.

TABLE 3

Properties of Test Compositions A–F

| Properties | A | B | C | D | E | F |
|---|---|---|---|---|---|---|
| MS @ 135° C. | | | | | | |
| 5 pt. Rise, min. | — | — | 4.14 | 2.17 | 0.42 | 1.67 |
| 10 pt. Rise, min. | — | — | 4.33 | 2.57 | 1.75 | 1.89 |
| ML(1 + 4) @ 100° C. | — | 108 | 125 | 127 | — | 128 |
| MDR @ 155° C., ½° Arc | | | | | | |
| ML, dN · m | 5.88 | 5.76 | 4.67 | 3.23 | 2.67 | 5.67 |
| MH, dN · m | 12.5 | 17.0 | 15.5 | 15.3 | 15.0 | 15.1 |
| Ts2, min | 1.7 | 1.2 | 0.9 | — | — | 1.1 |
| T25, min | 1.2 | 1.7 | 1.2 | — | — | 1.3 |
| T90, min | 35.3 | 31.3 | 27.8 | 25.9 | — | 28.9 |
| Physical Properties, Cured 6.5' @ 155° C. | | | | | | |
| Shore A | 60 | 60 | 60 | 64 | 58 | 61 |
| 100% Modulus, MPa | 1.5 | 2.6 | 2.6 | 2.6 | 2.2 | 2.0 |
| 300% Modulus, MPa | 4.6 | 5.8 | 6.2 | 6.1 | 8.2 | 4.8 |
| Tensile, MPa | 6.0 | 7.6 | 9.1 | 8.8 | 8.7 | 7.1 |
| Elongation, % | 380 | 380 | 390 | 420 | 320 | 390 |
| DIN Abrasion | 71 | — | 66 | 69 | 69 | 68 |

Example 2

A Minolta CR-100 ChromaMeter was used to quantitatively determine the lightness ($L^*$), red-green ($a^*$) and yellow-blue ($b^*$) colors of cured compounds in order to maximize light through-put (a measure of transparency) and to minimize or adjust the color. The ability to read print through these cured rubber compounds was also used as a subjective evaluation of the contact transparency of the ingredients in the formulation. Statistically designed experiments varying ingredients, and statistical analysis of variance (ANOVA) for effects on compound cure, physical and color properties were made.

Eight formulations (G-N) of EXXPRO™ elastomers with statistically varying para-methylstyrene and bromo para-methylstyrene levels were evaluated in a simple compound prepared only with precipitated silica and a zinc oxide/zinc stearate cure system. It was established that low levels of either bromine and/or para-methylstyrene provided the highest $L^*$ values with low, but not negative, $a^*$ and $b^*$ values, see Table 4. EXXPRO™ MDX 89-1 (5 wt-% pMS, 0.75 mol-% BrPMS) afforded the highest $L^*$ and lowest $a^*$ and $b^*$ values.

TABLE 4

Optical Properties of EXXPRO ™ Rubber Compounds

| Test Composition | Para-methylstyrene (weight-%) | Bromo para-methylstyrene (mole-%) | $L^*$ | $a^*$ | $b^*$ |
|---|---|---|---|---|---|
| G | 5 | 0.75 | 70.7 | 0.5 | 18.1 |
| H | 7.5 | 0.75 | 65.1 | 2.3 | 26.8 |
| I | 7.5 | 1.7 | 58.8 | 5.4 | 38.9 |
| J | 9.6 | 1.25 | 56.7 | 5.9 | 39.0 |
| K | 10 | 0.5 | 69.0 | 1.9 | 21.0 |
| L | 10 | 0.75 | 67.3 | 2.5 | 27.9 |
| M | 10 | 0.95 | 55.2 | 5.1 | 36.3 |
| N | 12.5 | 0.75 | 58.6 | 7.8 | 31.7 |

Example 3

Ten curative/accelerator systems thought useful in co-curing with the other sulfur-vulcanized tire compounds were screened. Acceptable curatives were obtained using zinc oxide/stearic acid; zinc oxide/zinc stearate; hexamethylene-1,6-bis(thiosulphate) disodium salt dihydrate (sold commercially as DURALINK HTS™ by Flexsys)/zinc stearate; DURALINK HTS™ /zinc oxide; and 1,3-Bis(citraconimidomethyl)benzene (sold commercially as PERKALINK™ 900 by Flexsys)/zinc stearate, since their use afforded transparent compounds from nearly colorless to a yellow or beige color. Butyl zimate/zinc stearate afforded a transparent, light brown-colored compound. The use of CBS (N-cyclohexyl-2-benzothiazole sulfenamide) afforded a beige compound, amylphenyl disulfide polymer (18.5–21% sulfur) (sold commercially as VULTAC 5 by Elf Atochem North America) afforded a grey compound, and A1100 afforded a brown compound; none were visibly transparent based on the ability to read print. Other organic peroxides can be used if they are not carried on a mineral filler such as clay.

Example 4

The curing of the elastomeric composition when EXXPRO™ Elastomer is present without in the absence of other rubbers was studied using various accelerators. Accelerators were evaluated at a fixed level of zinc oxide, stearic acid, and zinc stearate ($ZnSt_2$). Accelerators included the following (trade names in parenthesis): alcohol-amine (Triethanolamine), zinc dithiocarbamate (Methyl Zimate), thiuram (Methyl Tuads), thiosulfate (Duralink HTS), thiourea (Thiate U), sulfeneamide (CBS), thiazole (MBTS), zinc thiazole (ZMBT), amine (Hexamethylenetetramine), and amine (Diak #3). The use of Thiate U in the system at 160° C. showed a significant reduction in cure time, as shown in Table 5. In all of the test compositions in Table 5, the following components and amounts were present: EXXPRO™ 90-10 at 100 phr, Silica (Zeosil 1165MP) at 50 phr, processing aid (Sundex 8125) at 20 phr, stearic acid (HSt) at 1.8 phr, zinc oxide (ZnO) at 3 phr, zinc stearate ($ZnSt_2$) at 0.6 phr, and the accelerators at 0.6 phr. Using the zinc oxide, zinc stearate and Thiate U cure/accelerator system provides the fastest cure times with while maintaining good mechanical properties. These accelerators were also tested at 180° C., with similar results (not shown).

Example 5

Precipitated silicas made via an aqueous acidification process were screened as a filler for the composition, wherein EXXPRO™ MDX 89-1 is the elastomer and DURALINK HTS™/ zinc stearate as the curative system. It was observed that for precipitated silicas having approximately the same CTAB surface area (approximately 170 $m^2/g$), use of a precipitated silica having a higher salt content afforded a brown-colored transparent compound (Zeosil 1165MP from Rhone Poulenc) compared to lower salt-content precipitated silicas which afforded yellow-colored transparent compounds. Use of a precipitated silica prepared using $CO_2$/hydrogen chloride as the acid (Hi-Sil 243LD from PPG) is more desirable than one prepared using sulfuric acid (Zeopol 8745 from J. M. Huber) since the former afforded a fainter-yellow transparent compound. Use of a higher surface area, low salt-containing precipitated silica (Hi-Sil 195G from PPG) is more desirable since it appeared to afford a more contact transparent compound, and improved cured compound physical properties. Use of a high surface area fumed silica made via a gas phase condensation process, which affords a silica with essentially no salt (Cab-O-Sil M5 from Cabot) is desirable for optical properties.

TABLE 6

Formulations and Properties of Test Compositions O–T from Example 6.

| Ingredient (phr) | O | P | Q | R | S | T |
|---|---|---|---|---|---|---|
| EXXPRO ™ 89-4 | 100.0 | 100.0 | 100.0 | 0.0 | 0.0 | 0.0 |
| EXXPRO ™ 96-4 | 0.0 | 0.0 | 0.0 | 100.0 | 100.0 | 100.0 |
| Silica, Rhodia Zeosil 45 | 30.0 | 35.0 | 25.0 | 25.0 | 35.0 | 30.0 |
| PARAPOL ™ 950 | 15.0 | 10.0 | 10.0 | 20.0 | 20.0 | 15.0 |
| Zinc Stearate | 3.5 | 2.0 | 5.0 | 2.0 | 5.0 | 3.5 |
| Thiate U | 1.5 | 3.0 | 3.0 | 3.0 | 3.0 | 1.5 |
| Cure and Physical Properties | | | | | | |
| Minimum Torque, dN · m | 3.1 | 4.5 | 2.9 | 2.1 | 3.1 | 3.3 |
| Maximum Torque, dN · m | 7.9 | 9.0 | 6.0 | 5.0 | 6.0 | 7.7 |
| Ts2 (min) | 0.9 | 2.3 | 1.5 | 4.0 | 1.5 | 1.4 |

TABLE 5

Formulations and Properties of Test Compositions for Example 4 Test Accelerator Compounds.

| Accelerators MDR @ 160° C., ½° arc. | None | ZnSt₂ | Triethanol-amine | Methyl Zymate | Methyl Tuads | Duralin k HTS | Thiate U | CBS | MBTS | ZMBT | Hexa-methylene-tetramine | Diak #3 |
|---|---|---|---|---|---|---|---|---|---|---|---|---|
| ML, dN·m | 4.61 | 4.2 | 6.39 | 10.26 | 6.34 | 4.83 | 3.94 | 3.59 | 4.44 | 4.6 | 4.47 | 8.66 |
| MH, dN·m | 9.7 | 9.08 | 13.52 | 12.73 | 13.66 | 12.48 | 12.52 | 10.22 | 8.6 | 8.47 | 11.39 | 10.17 |
| MH-ML, dN·m | 5.09 | 4.88 | 7.13 | 2.47 | 7.32 | 7.65 | 8.58 | 6.63 | 4.16 | 3.87 | 6.91 | 1.51 |
| Ts2 (min) | 4.08 | 7.77 | 8.42 | 25.61 | 4.38 | 2.08 | 0.66 | 0.82 | 8.59 | 12.2 | 2.65 | 0 |
| T25 (min) | 1.18 | 1.19 | 7.65 | 16.67 | 4.09 | 1.96 | 0.7 | 0.54 | 1.16 | 2.48 | 1.67 | 21.65 |
| T50 (min) | 8.37 | 11.53 | 13.92 | 20.1 | 8.18 | 4.52 | 1.33 | 8.51 | 9.42 | 11.56 | 7.8 | 24.29 |
| T75 (min) | 19.17 | 20.83 | 20.98 | 24.42 | 15.6 | 10.83 | 3.18 | 18.61 | 19.54 | 20.38 | 15.35 | 26.97 |
| T90 (min) | 25.67 | 26.21 | 25.99 | 27.46 | 22.84 | 20.13 | 7.85 | 25.07 | 25.53 | 25.88 | 22.41 | 28.73 |
| T95 (min) | 27.81 | 28.03 | 27.87 | 28.67 | 25.99 | 24.82 | 13.6 | 27.45 | 27.65 | 27.88 | 25.71 | 29.35 |
| RATE | 1.9 | 1.9 | 0.5 | 0.4 | 0.9 | 2.2 | 4.5 | 13.2 | 1.5 | 1.4 | 2.9 | 0.3 |
| T90 + 5 minutes cured @ 160° C. | | | | | | | | | | | | |
| SHORE A @ 23° C. | 43.5 | 46.7 | 53.3 | 48.3 | 49.9 | 49.1 | 52.9 | 43.9 | 42.7 | 44.3 | 52.5 | 46.3 |
| 20% Modulus (MPa) | 0.61 | 0.61 | 0.81 | 0.73 | 0.73 | 0.73 | 0.79 | 0.62 | 0.59 | 0.65 | 0.79 | 0.67 |
| 100% Modulus (MPa) | 1 | 1.04 | 1.39 | 1.25 | 1.21 | 1.28 | 1.95 | 0.96 | 0.97 | 0.97 | 1.43 | 1.11 |
| 200% Modulus (MPa) | 1.58 | 1.7 | 2.48 | 2.28 | 2.21 | 2.29 | 4.82 | 1.54 | 1.44 | 1.46 | 2.41 | 1.85 |
| 300% Modulus (MPa) | 2.65 | 2.95 | 4.17 | 4.18 | 4.1 | 4.02 | 8.71 | 2.67 | 2.35 | 2.4 | 4.02 | 3.22 |
| TENSILE, MPa | 8.95 | 11.49 | 12.27 | 13.65 | 12.76 | 11.48 | 12.57 | 11.23 | 11.69 | 11.21 | 11.89 | 11.02 |
| ELONGATION % | 720 | 717 | 702 | 633 | 643 | 650 | 392 | 759 | 814 | 784 | 583 | 681 |
| ENERGY at Break (J) | 9.13 | 10.78 | 12.16 | 10.57 | 10.34 | 10.16 | 6.66 | 11.04 | 11.99 | 11.03 | 8.55 | 9.59 |

Example 6

In this example, the elastomeric composition is a mixture of EXXPRO™ Elastomers and a polybutene processing aid such as PARAPOL™. A variation of the PARAPOL™ component from 10 phr to 20 phr when Thiate U is used as the accelerator shows that increasing the PARAPOL™ 950 content increases the transparency (ChromaMeter-L value is higher) and reduces the yellowness (ChromaMeter-b* value is lower) as shown in Table 6 in test compositions O-T. These data shown that the Din Abrasion index value is relatively low, but the presence of PARAPOL™ improves the optical properties when compared to the optical properties of EXXPRO™ Elastomers alone as shown in Table 4. The b* values for samples O-T are low when compared to the values in Table 4, while the L values advantageously increased for the O-T samples relative to the values in Table 4.

TABLE 6-continued

Formulations and Properties of Test Compositions O–T from Example 6.

| Ingredient (phr) | O | P | Q | R | S | T |
|---|---|---|---|---|---|---|
| T50 (min) | 1.2 | 2.7 | 1.1 | 2.2 | 1.0 | 1.6 |
| T90 (min) | 6.3 | 12.7 | 3.5 | 11.2 | 3.0 | 7.9 |
| Hardness | 46.7 | 51.5 | 45.7 | 43.1 | 42.9 | 47.1 |
| % Elongation at Break | 170.0 | 226.0 | 215.0 | 208.0 | 177.0 | 229.0 |
| Tensile Strength (MPa) | 5.4 | 8.1 | 5.2 | 4.1 | 4.0 | 5.4 |
| 20% Modulus (MPa) | 0.8 | 0.9 | 0.6 | 0.4 | 0.8 | 0.7 |
| 100% Modulus (MPa) | 3.0 | 3.4 | 2.1 | 1.5 | 2.6 | 2.3 |
| 300% Modulus (MPa) | 1.1 | 7.2 | 3.6 | 3.7 | 1.1 | 4.7 |
| Energy to Break (J) | 1.4 | 3.1 | 2.0 | 1.3 | 1.4 | 2.1 |
| Din Abrasion Index | 50.0 | 67.0 | 53.0 | 30.0 | 39.0 | 48.0 |
| Optical Properties | | | | | | |
| ChromaMeter-L | 83.0 | 81.9 | 80.6 | 83.1 | 84.9 | 84.9 |
| ChromaMeter-a* | −0.2 | −0.1 | −0.1 | −0.2 | −0.5 | −0.5 |
| ChromaMeter-b* | 6.6 | 7.5 | 6.6 | 7.2 | 6.2 | 6.4 |

Example 7

The test compositions U-X in this example are mixtures of EXXPRO™ elastomers and NATSYN™ 2200 rubber in the absence of PARAPOL™. Transparent cured EXXPRO™ Elastomer compounds were prepared using precipitated and fumed silicas as the fillers, and a sulfur curing system. All cured compounds were contact transparent, but had a yellow to brown color depending upon the specific ingredients, and afforded compounds with physical properties appropriate for use in a variety of rubber applications. Test compositions U-X are shown in Table 7. The Din Abrasion index values are relatively low when high cis-polybutadiene is not present, although higher than those values in Table 6 when EXXPRO™ Elastomers is the only elastomer/rubber component. Further, in the absence of PARAPOL™, the optical properties are diminished as seen by the lower L values and higher b* values relative to those in, for example, Table 6, compositions O-T.

TABLE 7

Formulations and Properties of Transparent Rubber Compounds in Example 7

| Ingredients (phr) | U | V | W | X |
|---|---|---|---|---|
| EXXPRO ™ MDX 96-4 | 50 | 50 | 50 | 50 |
| NATSYN ™ 2200 | 50 | 50 | 50 | 50 |
| Silica, HiSil 243LD | 45 | 0 | 0 | 35 |
| Silica, HiSil 195T | 0 | 45 | 0 | 0 |
| Silica, Zeosil 1115MP | 0 | 0 | 45 | 0 |
| Silica, Cab-O-Sil M5 | 0 | 0 | 0 | 10 |
| Si69 | 3.6 | 3.6 | 3.6 | 3.6 |
| FLEXON ™ 766 | 6 | 6 | 6 | 6 |
| Wax, Paraffin | 4 | 4 | 4 | 4 |
| PEG 3350 | 4 | 4 | 4 | 4 |
| Zinc oxide | 1 | 1 | 1 | 1 |
| Stearic acid | 1 | 1 | 1 | 1 |
| Sulfur | 0.8 | 0.8 | 0.8 | 0.8 |
| MBTS | 0.6 | 0.6 | 0.6 | 0.6 |
| TBBS | 1.2 | 1.2 | 1.2 | 1.2 |
| DPG | 0.8 | 0.8 | 0.8 | 0.8 |
| Cure Properties | | | | |
| Minimum Torque, dN.m | 1.97 | 2.8 | 1.41 | 2.18 |
| Maximum Torque, dN.m | 8.47 | 10.3 | 7.04 | 8.95 |
| Delta Torque | 6.5 | 7.49 | 5.63 | 6.78 |
| Ts2 Scorch, min | 1.26 | 1.29 | 1.33 | 1.29 |
| T50 Cure Time, min | 1.49 | 1.57 | 1.51 | 1.54 |
| T90 Cure Time, min | 2.5 | 2.29 | 2.52 | 2.41 |
| Physical Properties | | | | |
| Hardness | 49.9 | 53.5 | 47.1 | 51.1 |
| Strain at Break (%) | 582.42 | 479.04 | 576.32 | 611.96 |
| Stress at Break (MPa) | 8.44 | 8.91 | 11.11 | 10.11 |
| 20% Modulus (MPa) | 0.64 | 0.79 | 0.52 | 0.65 |
| 100% Modulus (MPa) | 1.43 | 1.84 | 1.25 | 1.45 |
| 300% Modulus (MPa) | 4.23 | 5.49 | 4.57 | 4.32 |
| Energy to Break (J) | 9.04 | 6.72 | 10.8 | 10 |
| Dispersion | 6.1 | 5.1 | 8 | 5.5 |
| DIN Abrasion Index | 90 | 99 | 105 | 95 |
| Mooney Viscosity (1 + 4 @ 100° C.) | 50.8 | 59.8 | 46.2 | 54.4 |
| Optical Properties | | | | |
| ChromaMeter L | 69.7 | 74.5 | 77.1 | 76.2 |
| ChromaMeter a* | 3.5 | 1.2 | 1.7 | 0.4 |
| ChromaMeter b* | 44.6 | 40.2 | 37.2 | 38.2 |

Example 8

A composition for a colorable tire tread was prepared, data for which is shown in Table 8. This composition differs from a standard tire tread formulation in several ways. For example, EXXPRO™ Elastomer polymers are used instead of an equal weight of solution-polymerized styrene butadiene rubber (sSBR) to improve cured compound dynamic and physical properties. Also, Si69 is used as the silane-coupling agent instead of the more common X50S (which is 50% by weight Si69 carried on N330 carbon black). In addition, no antiozonant is used since this can also stain or discolor the tread composition. Compound colorability can be further improved by using titanium dioxide as a non-reinforcing, but whitening pigment. Variations on this formulation are found in Example 9.

TABLE 8

Colorable Rubber Compound Formulation in Example 8

| Ingredient | phr |
|---|---|
| Brominated isobutylene-co-para-methylstyrene (EXXPRO ™), - varying bromine, para-methylstyrene contents | 20 |
| Styrene-butadiene rubber (sSBR), - varying styrene, vinyl contents | 55 |
| Polybutadiene, 98% cis | 25 |
| Precipitated silica | 75 |
| Titanium dioxide | 20 |
| Silane coupling agent (10% of silica), Si-69 | 7.5 |
| Aromatic oil, Sundex 8125 | 24 |
| Zinc oxide | 2 |
| Stearic acid | 1 |
| Antioxidant, mixed diaryl-p-phenylenediamine | 0.75 |
| Sulfur | 1.2 |
| Sulfeneamide, N-Cyclohexyl-2-benzothiazyl-sulfeneamide (CBS) | 1.75 |
| Diphenylguanidine | 1.2 |

Example 9

The test compositions A1-H1 in the present example are variations on the composition in Table 8, using an EXXPRO™ elastomer and an sSBR having varying amounts of either styrene comonomer or vinyl comonomer. The viscoelastic nature of EXXPRO™ elastomers increases the loss modulus (G") or tangent delta values of the cured compound measured at 0° C. This dynamic value is a laboratory test useful in predicting the wet traction performance of tread compounds on tires. A higher value is desirable. The tangent delta value measured at 60° C. in lab instruments is reduced when using EXXPRO™ elastomers indicating a lower heat build-up value. This is predictive of tire rolling resistance. A lower value is desirable. The complex modulus value (G*) measured at 60° C. is used as a lab predictor of the dry handling, or cornering, characteristics of the tread compound on the tire. A higher value is needed when a higher speed rated tire (i.e. H-, V-, Z-rated) is desirable. The magnitude of these benefits when using EXXPRO™ Elastomers is also dependent on the particular polymers used in the blend system. When sSBR is used instead of a cis-polybutadiene, the Din Abrasion index values are low.

TABLE 9

Colorable Rubber Compound Properties in Example 9

|  | A1 | B1 | C1 | D1 | E1 | F1 | G1 | H1 |
|---|---|---|---|---|---|---|---|---|
| Ingredients, phr | | | | | | | | |
| EXXPRO ™, phr | 0 | 20 | 0 | 20 | 0 | 20 | 0 | 20 |
| SSBR, phr | 75 | 55 | 75 | 55 | 75 | 55 | 75 | 55 |
| -sSBR, %-styrene | 15 | 15 | 15 | 15 | 20 | 20 | 23 | 23 |
| -sSBR, %-vinyl | 57 | 57 | 30 | 30 | 63 | 63 | 58 | 58 |
| Cure Properties | | | | | | | | |
| Minimum Torque, dN·m | 3.21 | 2.22 | 4.05 | 4.21 | 3.85 | 3.37 | 4.29 | 4.42 |
| Maximum Torque, dN·m | 20.27 | 18.45 | 22.95 | 23.20 | 19.50 | 20.53 | 22.10 | 21.10 |
| Ts2 Scorch, min | 2.81 | 4.22 | 2.27 | 2.91 | 2.65 | 3.90 | 2.59 | 3.33 |
| T'50 | 4.74 | 6.56 | 3.89 | 5.22 | 4.49 | 6.59 | 5.07 | 6.13 |
| T'90 | 9.99 | 12.60 | 6.91 | 9.19 | 11.53 | 13.21 | 9.66 | 12.19 |
| Physical Properties | | | | | | | | |
| Hardness | 60.30 | 57.90 | 62.10 | 64.70 | 62.70 | 64.70 | 64.90 | 63.70 |
| Elongation (%) | 335.42 | 322.16 | 349.45 | 346.48 | 299.62 | 255.32 | 299.24 | 254.22 |
| Stress at Break (MPa) | 16.48 | 13.03 | 16.68 | 15.19 | 16.09 | 12.08 | 15.05 | 12.36 |
| 20% Modulus (MPa) | 0.96 | 0.84 | 1.00 | 1.08 | 0.92 | 1.07 | 1.01 | 1.04 |
| 100% Modulus (MPa) | 2.47 | 2.36 | 2.49 | 2.81 | 2.75 | 3.22 | 2.94 | 3.20 |
| 300% Modulus (MPa) | 13.92 | 11.59 | 13.26 | 12.5 | — | — | — | — |
| Energy to Break (J) | 5.90 | 4.91 | 6.44 | 6.59 | 6.31 | 3.98 | 6.06 | 3.78 |
| Dispersion Rating | 8.6 | 7.4 | 8.8 | 7.5 | 7.9 | 7.8 | 8.1 | 7.7 |
| Din Abrasion Index | 125 | 119 | 141 | 112 | 114 | 90 | 109 | 97 |
| Dynamic Properties | | | | | | | | |
| G" @ 0° C. (MPa) | 0.4486 | 0.2743 | 0.4462 | 0.6187 | 0.4802 | 0.6098 | 0.7162 | 0.5347 |
| Tangent delta @ 0° C. | 0.1715 | 0.1594 | 0.1626 | 0.1969 | 0.1878 | 0.2314 | 0.2126 | 0.2095 |
| G* @ 60° C. (MPa) | 1.9111 | 1.2963 | 2.0522 | 2.1211 | 1.7042 | 1.9006 | 2.1562 | 1.7225 |
| Tangent delta @ 60° C. | 0.1153 | 0.0995 | 0.1096 | 0.1085 | 0.0942 | 0.0985 | 0.1374 | 0.1071 |

Example 10

The effect of using an alkylperoxide cure system Varox 231XL (R. T. Vanderbilt) in place of the traditional sulfur cure system was studied using an EXXPRO™ elastomer and a mix of other rubbers. Varox 231 XL is 1,1-bis(t-butylperoxyl)-3,3,5-trimethylcyclohexane as 40% active on an inert carrier of calcium carbonate (32%) and silicon dioxide (28%). Tests performed on compositions I1 (sulfur cure) and J1 (alkylperoxide cure) in Table 10 show that the use of a peroxide cure system increases transparency (higher ChromaMeter-L value) and decreases the yellow color (lower ChromaMeter-b* value) compared to the use of a sulfur cure system in a cured compound using FLEXON™ 766 as the processing aid. Overall, the use of the alkylperoxide system improves the optical properties of the system when I1 (sulfur cure) is compared to J1 (alkylperoxide cure), but the Din Abrasion index values are relatively low due to the presence of NATSYN™ 2200.

TABLE 10

Formulations and Properties of Test Compositions I1 and J1 in Example 10.

| Ingredient (phr) | I1 | J1 |
|---|---|---|
| EXXPRO ™ 89-1 | 50.0 | 50.0 |
| NATSYN ™ 2200 | 25.0 | 25.0 |
| BR 1207 | 25.0 | 25.0 |
| Silica, Ultrasil VN3 | 25.0 | 25.0 |
| Silica, Cab-O-Sil M5 | 10.0 | 10.0 |
| Si69 | 3.5 | 3.5 |
| Wax, Paraffin | 2.0 | 2.0 |
| FLEXON ™ 766 | 6.0 | 6.0 |
| Zinc oxide | 1.0 | 3.0 |
| Stearic acid | 1.0 | 1.5 |
| Sulfur | 0.6 | 0.0 |
| MBTS | 0.3 | 0.0 |
| TBBS | 1.2 | 0.0 |
| DPG | 0.8 | 0.0 |
| Peroxide, Varox 231XL | 0.0 | 3.0 |
| Cure and Physical Properties | | |
| MV: ML(1 + 4) @ 100° C. | 60.6 | 63.6 |
| Minimum Torque, dN · m | 2.0 | 2.4 |
| Maximum Torque, dN · m | 8.6 | 6.1 |
| Ts2 (min) | 2.5 | 1.6 |
| T50 (min) | 2.9 | 1.3 |
| T90 (min) | 6.1 | 7.8 |
| Hardness | 48.7 | 44.3 |
| % Elongation at Break | 486.0 | 480.8 |
| Tensile Strength (MPa) | 6.9 | 2.8 |
| 20% Modulus (MPa) | 0.6 | 0.4 |
| 100% Modulus (MPa) | 1.4 | 0.9 |
| 300% Modulus (MPa) | 4.2 | 2.1 |
| Energy to Break (J) | 5.3 | 3.0 |
| Din Abrasion index | 106 | 82 |
| Optical Properties | | |
| ChromaMeter-L | 74.0 | 85.7 |
| ChromaMeter-a* | 1.6 | −1.3 |
| ChromaMeter-b* | 4.8 | 21.1 |

Example 11

The test compositions K1 and L1 in Table 11 shown the effects of using the alkylperoxide cure system with Thiate U, and using the PARAPOL™ processing aid. Comparing the data in Table 10 with Table 11, it is apparent that the optical properties are improved for the test compositions K1 and L1 over I1 and J1. When PARAPOL™ 950 is used in place of the conventional processing aid in the peroxide cured outsole formulation, optical properties are improved by reduced yellowness (b*) and increased transparency (L) as shown in Table 11.

TABLE 11

Formulations and Properties of Test Compositions K1 and L1 in Example 11.

| Ingredient (phr) | K1 | L1 |
| --- | --- | --- |
| EXXPRO ™ 89-1 | 50.0 | 50.0 |
| BR 1207 | 25.0 | 25.0 |
| NATSYN ™ 2200 | 25.0 | 25.0 |
| Silica, Rhodia Zeosil 45 | 25.0 | 35.0 |
| Silica, Aerosil 200 | 10.0 | 0.0 |
| PARAPOL ™ 950 | 10.0 | 10.0 |
| DPG | 1.8 | 1.8 |
| Zinc Stearate | 5.0 | 5.0 |
| Trigonox 29 | 1.0 | 2.0 |
| Thiate U | 1.0 | 1.0 |
| Cure and Physical Properties | | |
| MV: ML(1 + 4)@ 100° C. | 110.3 | 107.5 |
| Minimum Torque dN · m | 2.5 | 2.6 |
| Maximum Torque dN · m | 11.4 | 12.3 |
| Ts2 (min) | 0.4 | 0.4 |
| T50 (min) | 0.6 | 0.6 |
| T90 (min) | 4.3 | 2.8 |
| Hardness | 47.9 | 48.9 |
| % Elongation at Break | 519.0 | 415.0 |
| Tensile Strength (MPa) | 9.7 | 7.6 |
| 20% Modulus (MPa) | 0.6 | 0.7 |
| 100% Modulus (MPa) | 1.8 | 1.9 |
| 300% Modulus (MPa) | 4.7 | 5.1 |
| Energy to Break (j) | 8.0 | 5.4 |
| Din Abrasion Index | 89.0 | 82.0 |
| Optical Properties | | |
| ChromaMeter-L | 83.7 | 83.7 |
| ChromaMeter-a* | -2.7 | -2.9 |
| ChromaMeter-b* | 14.0 | 14.6 |

Example 12

The present set of test compositions M1-P1 shows the improved properties of the elastomeric composition when EXXPRO™ elastomers and BR 1207 are used as the primary components with the processing aid PARAPOL™, an alkylperoxide (not associated with a carrier) is used as the cure agent, and Thiate U is used as an accelerator. The example 12 compositions represent the preferred embodiments of the present invention.

Brominated isobutylene-co-para-methylstyrene-containing formulations for tire tread and rubber outsole applications were developed using binary blends of EXXPRO™ MDX 90-10 with high cis-polybutadiene rubber (BR 1207, BUDENE™ 1207). The EXXPRO™ Elastomer is used predominantly for improving traction properties, while the polybutadiene is used to improve abrasion resistance. For shoe soles, polymers were filled with precipitated and fumed silicas in order to reinforce the polymers, but also to maintain good colorability for appearance. A silane coupling agent is used in the present example in order to further increase the abrasion resistance of polybutadiene formulations, but has little effect in EXXPRO™ Elastomers. Thus, processing aids such as PARAPOL™ 950 and PARAPOL™ 2500 were added as part of the compositions. Table 12 lists the ingredients in test compositions M1-P1 used in testing. Trigonox 29 is an alkyl peroxide made by Akzo Nobel Chemicals, and is 1,1-di-tert-butylperoxy-3,3,5-trimethylcyclohexane. Trigonox 29, unlike some alkyl peroxides sold commercially is not on a carrier.

TABLE 12

Formulations of Test Compositions M1–P1 in Example 12.

| Ingredient, phr | M1 | N1 | O1 | P1 |
| --- | --- | --- | --- | --- |
| EXXPRO ™ 89-1 | 30 | 40 | 50 | 30 |
| BR 1207 | 70 | 60 | 50 | 70 |
| Silica, PPG HiSil 195G | 35 | 35 | 35 | 35 |
| Silane Coupler, Si69 | 2.52 | 2.16 | 1.8 | 2.52 |
| Silica, Aerosil 200 | 10 | 10 | 10 | 10 |
| PARAPOL ™ 950 | 10 | 10 | 10 | 0 |
| PARAPOL ™ 2500 | 0 | 0 | 0 | 10 |
| Zinc Stearate | 5 | 5 | 5 | 5 |
| Trigonox 29 | 1 | 0.9 | 0.8 | 1 |
| Thiate U | 0.8 | 0.9 | 1 | 0.8 |

Processing, cure, mechanical, and optical properties were measured for these test compounds, the data for which is shown in Table 13A. These values were obtained using the methods described in the previous examples. The "T" values are cure times in minutes. "MOD" values are modulus values, and the ChromaMeter values are as described above. Lab abrasion index (resistance), tensile strength and elongation at break values increase with increasing high cis-polybutadiene (BR 1207) content. However, increased use of BR reduces the traction of the composition. Since increased use of EXXPRO™ Elastomers increases traction, a balance of properties can be achieved depending upon the particular application of the elastomeric composition.

Surprisingly, the use of the relatively higher molecular weight PARAPOL™ 2500 in place of the PARAPOL™ 950 results in reduced yellowing as indicated by the ChromaMeter-b* values, and increased hardness, tensile strength, and elongation at break values. Further, when comparing test composition Ml (PARAPOL™ 950 present 10 phr) with test composition P1 (PARAPOL™ 2500 present 10 phr), it is found that the viscosity (MV: ML(1+4)) increases with increasing molecular weight of the processing aid. Overall, the use of BR 1207 improves the Din Abrasion index values when compared to the V-X test compositions in Table 7 where the rubber component NATSYN™ is used instead of BR 1207. Further, the optical properties of the compositions M1-P1 are improved as compared to test compositions V-X in Table 7 due to the presence of the PARAPOL™ processing aid in place of the FLEXON™ oil.

TABLE 13A

Properties of Test Compositions M1–P1 in Example 12

|  | M1 | N1 | O1 | P1 |
|---|---|---|---|---|
| Processing | | | | |
| MV: ML(1 + 4) @ 100° C. | 85.3 | 82.9 | 87.7 | 92.6 |
| MS @ 135° C. −5 pt | 3.3 | 3.06 | 2.39 | 3.39 |
| MS @ 135° C. −10 pt | 3.89 | 3.6 | 2.77 | 3.96 |
| Cure: MDR @ 150° C., ½° ARC | | | | |
| ML, dN · m | 3.81 | 3.89 | 4.34 | 4.11 |
| MH, dN · m | 15.37 | 15.1 | 15.92 | 17.32 |
| MH-ML | 11.55 | 11.21 | 11.57 | 13.21 |
| Ts2 (min) | 0.87 | 0.94 | 0.91 | 0.74 |
| T25 (min) | 1.14 | 1.2 | 1.2 | 1.07 |
| T50 (min) | 2.38 | 2.54 | 2.45 | 2.25 |
| T75 (min) | 5.55 | 5.63 | 4.99 | 4.94 |
| T90 (min) | 14.56 | 14.0 | 12.34 | 12.2 |
| T95 (min) | 20.57 | 20.24 | 19.05 | 18.34 |
| RATE | 3.7 | 3.6 | 3.7 | 4.4 |
| Physical Properties | | | | |
| 20% Modulus (MPa) | 1.04 | 1.02 | 1.19 | 1.17 |
| 100% Modulus (MPa) | 2.75 | 2.98 | 3.68 | 3.05 |
| 200% Modulus (MPa) | 5.45 | 5.81 | 6.87 | 6.18 |
| 300% Modulus (MPa) | 9.05 | 9.51 | 0 | 10.2 |
| TENSILE, MPa | 13.13 | 11.38 | 10.48 | 15.09 |
| ELONGATION, % | 399 | 345 | 292 | 413 |
| ENERGY to BREAK (J) | 8.14 | 6.16 | 5.08 | 9.49 |
| SHORE A @ 23° C. | 57.7 | 56.5 | 60.1 | 61.1 |
| DIN ABRASION | 300 | 254 | 192 | 302 |
| DISPERSION | 7.4 | 5.7 | 4.8 | 8 |
| Optical Properties | | | | |
| ChromaMeter-L | 85.27 | 84.79 | 83.42 | 85.76 |
| ChromaMeter-a* | −2.84 | −2.98 | −2.87 | −3.31 |
| ChromaMeter-b* | 20 | 21.06 | 24.45 | 17.6 |

The viscoelastic nature, or "dynamic properties", of the samples M1-P1 were also measured as described above and are shown in Table 13B. The loss modulus (G") or tangent delta values of the cured compounds were measured at −60, −30, 0, 30 and 60° C. These dynamic values at 0° are laboratory tests useful in predicting the wet traction performance of tread compounds on shoes and tires. A higher value is desirable. The dynamic values at −30° C. are predictors of snow traction, while the 30° C. values are predictors of dry traction. The dynamic values at 60° C. are an indicator rolling resistance. The tangent delta value measured at 60° C. in lab instruments is reduced when using EXXPRO™ Elastomers, indicating a lower heat build-up value. This is predictive of tire rolling resistance. A lower value is desirable. The complex modulus value (G*) measured at 60° C. is used as a lab predictor of the dry handling, or cornering, characteristics of the tread compound on the tire. A higher value is needed when a higher speed rated tire (i.e. H-, V-, Z-rated) is desirable.

TABLE 13B

Properties of Test Compositions M1–P1 in Example 12

| Dynamic Properties | M1 | N1 | O1 | P1 |
|---|---|---|---|---|
| Temp: −60° C. | | | | |
| G', MPa | 323 | 327 | 370 | 271 |
| G", MPa | 107 | 124 | 155 | 98.9 |
| G*, MPa | 340 | 350 | 401 | 288 |
| Tan-delta | 0.3298 | 0.3783 | 0.4180 | 0.3650 |

TABLE 13B-continued

Properties of Test Compositions M1–P1 in Example 12

| Dynamic Properties | M1 | N1 | O1 | P1 |
|---|---|---|---|---|
| Temp: −30° C. | | | | |
| G', MPa | 40.1 | 32.8 | 29.5 | 40.1 |
| G", MPa | 12.9 | 13.7 | 13.9 | 12.3 |
| G*, MPa | 42.2 | 35.6 | 32.6 | 42.0 |
| Tan-delta | 0.3217 | 0.4180 | 0.4705 | 0.3071 |
| Temp: 0° C. | | | | |
| G', MPa | 5.38 | 4.81 | 6.24 | 6.39 |
| G", MPa | 0.692 | 0.671 | 0.880 | 0.834 |
| G*, MPa | 5.43 | 4.86 | 6.30 | 6.44 |
| Tan-delta | 0.1285 | 0.1396 | 0.1411 | 0.1305 |
| Temp: 30° C. | | | | |
| G', MPa | 5.82 | 5.09 | 6.05 | 6.39 |
| G", MPa | 0.324 | 0.262 | 0.293 | 0.404 |
| G*, MPa | 5.83 | 5.10 | 6.05 | 6.40 |
| Tan-delta | 0.0557 | 0.0515 | 0.0485 | 0.0632 |
| Temp: 60° C. | | | | |
| G', MPa | 6.22 | 5.40 | 6.07 | 6.46 |
| G", MPa | 0.205 | 0.178 | 0.193 | 0.265 |
| G*, MPa | 6.22 | 5.40 | 6.07 | 6.46 |
| Tan-delta | 0.0330 | 0.0330 | 0.0318 | 0.0410 |

While certain representative embodiments and details have been shown for the purposes of illustrating the invention, it will be apparent to those skilled in the art that various changes in the process and products disclosed herein may be made without departing from the scope of the invention, which is defined in the appended claims.

We claim:

1. A colorable or transparent elastomeric composition comprising:
   a) from 10 to 100 parts, per hundred parts rubber, of a halogenated copolymer of a $C_4$ to $C_7$ isoolefin and a para-alkylstyrene;
   b) from 10 to 90 parts, per hundred parts rubber, of a compound selected from the group consisting of polybutadiene, high cis-polybutadiene, natural rubber, polyisoprene, styrene-butadiene rubber, styrene-isoprene-butadiene rubber, isoprene-butadiene rubber, ethylene-propylene diene rubber, and blends thereof,
   c) from 30 to 80 parts of a non-black filler; and
   d) a polybutene processing aid;
   wherein the colorable or transparent elastomeric composition has a ChromaMeter L value of greater than 55.

2. The colorable or transparent elastomeric composition of claim 1, wherein the $C_4$ to $C_7$ isoolefin is Isobutylene; the para-alkylstyrene is para-methylstyrene; and the non-black filler is silica.

3. The colorable or transparent elastomeric composition of claim 2, wherein the silica is precipitated silica.

4. The colorable or transparent elastomeric composition of claim 1 or 2, wherein the colorable or transparent elastomeric composition further comprises from 2 to 20 weight percent of an organosilane-coupling agent, based on the weight of the non-black filler.

5. The colorable or transparent elastomeric composition of claim 4, wherein the colorable or transparent elastomeric composition comprises from 2 to 15 weight percent of the organosilane-coupling agent, based on the weight of the non-black filler.

6. The colorable or transparent elastomeric composition of claim 4, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and mixtures thereof.

7. The colorable or transparent elastomeric composition of claim 4, wherein the organosilane-coupling agent is bis(3-triethoxysilyl)-propyl)-tetrasulfane.

8. The colorable or transparent elastomeric composition of claim 1 or 2, wherein the colorable or transparent elastomeric composition is covulcanized.

9. The colorable or transparent elastomeric composition of clam 1 or 2, wherein the colorable or transparent elastomeric composition is cured.

10. The colorable or transparent elastomeric composition of claim 1, wherein the ChromaMeter L value is from 65 to 90.

11. The colorable or transparent elastomeric composition of claim 10, wherein the colorable or transparent elastomeric composition has a ChromaMeter b value of 40 or less.

12. The colorable or transparent elastomeric composition of claim 10, wherein the colorable or transparent elastomeric composition has a ChromaMeter b value of 35 or less.

13. The colorable or transparent elastomeric composition of claim 10, wherein the colorable or transparent elastomeric composition has a ChromaMeter b value of 30 or less.

14. A colorable or transparent elastomeric composition comprising:
   a) from 10 to 100 parts, per hundred parts rubber, of a halogenated copolymer of a $C_4$ to $C_7$ isoolefin and a para-alkylstyrene, wherein the copolymer has a Mooney viscosity of from 30 to 50;
   b) from 10 to 90 parts, per hundred parts rubber, of a compound selected from the group consisting of polybutadiene, high cis-polybutadiene, natural rubber, polyisoprene, styrene-butadiene rubber, styrene-isoprene-butadiene rubber, isoprene-butadiene rubber, ethylene-propylene diene rubber, and blends thereof;
   c) from 30 to 80 parts of a non-black filler; and
   d) a polybutene processing aid;
      wherein the colorable or transparent elastomeric composition has a ChromaMeter L value of greater than 55.

15. The colorable or transparent elastomeric composition of claim 14, wherein the $C_4$ to $C_7$ isoolefin is isobutylene; the para-alkylstyrene is para-methylstene; and the non-black filler is silica.

16. The colorable or transparent elastomeric composition of claim 15, wherein the silica is precipitated silica.

17. The colorable or transparent elastomeric composition of claim 14 or 15, wherein the colorable or transparent elastomeric composition further comprises from 2 to 20 weight percent of an organosilane-coupling agent, based on the weight of the non-black filler.

18. The colorable or transparent elastomeric composition of clam 17, wherein the colorable or transparent elastomeric composition comprises from 2 to 15 weight percent of the organosilane-coupling agent, based on the weight of the non-black filler.

19. The colorable or transparent elastomeric composition of claim 17, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and mixtures thereof.

20. The colorable or transparent elastomeric composition of claim 17, wherein the organosilane-coupling agent is bis(3-(triethoxysilyl)-propyl)-tetrasulfane.

21. The colorable or transparent elastomeric composition of claim 14 or 15, wherein the colorable or transparent elastomeric composition is covulcanized.

22. The colorable or transparent elastomeric composition of claim 14 or 15, wherein the colorable or transparent elastomeric composition is cured.

23. The colorable or transparent elastomeric composition of claim 14, wherein the ChromaMeter L value is from 65 to 90.

24. The colorable or transparent elastomeric composition of claim 23, wherein the colorable or transparent elastomeric composition has a ChromaMeter b value of 40 or less.

25. The colorable or transparent elastomeric composition of claim 23, wherein the colorable or transparent elastomeric composition has a ChromaMeter b value of 35 or less.

26. The colorable or transparent elastomeric composition of claim 23, wherein the colorable or transparent elastomeric composition has a ChromaMeter b value of 30 or less.

27. A colorable or transparent elastomeric composition comprising:
   a) from 10 to 100 parts, per hundred parts rubber, of a terpolymer of isobutylene, para-alkylstyrene, and halogenated para-alkylstyrene;
   b) from 10 to 90 parts, per hundred parts rubber, of a compound selected from the group consisting of polybutadiene, high cis-polybutadiene, natural rubber, polyisoprene, styrene-butadiene rubber, styrene-isoprene-butadiene rubber, isoprene-butadiene rubber, ethylene-propylene diene rubber, and blends thereof;
   c) from 30 to 80 parts of a non-black filler, and
   d) a polybutene processing aid;
      wherein the colorable or transparent elastomeric composition has a ChromaMeter L value of greater than 55.

28. The colorable or transparent elastomeric composition of claim 27, wherein the para-alkylstyrene is para-methylstyrene; the halogenated para-alkylstyrene is bromo para-methylstyrene; and the non-black filler is silica.

29. The colorable or transparent elastomeric composition of claim 28, wherein the silica is precipitated silica.

30. The colorable or transparent elastomeric composition of claim 27 or 28, wherein the colorable or transparent elastomeric composition further comprises from 2 to 20 weight percent of an organosilane-coupling agent, based on the weight of the non-black filler.

31. The colorable or transparent elastomeric composition of claim 30, wherein the colorable or transparent elastomeric composition comprises from 2 to 15 weight percent of the organosilane-coupling agent, based on the weight of the non-black filler.

32. The colorable or transparent elastomeric composition of claim 30, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and mixtures thereof.

33. The colorable or transparent elastomeric composition of claim 30, wherein the organosilane-coupling agent is bis(3(triethoxysilyl)-propyl)-tetrasulfane.

34. The colorable or transparent elastomeric composition of claim 27 or 28, wherein the colorable or transparent elastomeric composition is covulcanized.

35. The colorable or transparent elastomeric composition of claim 27 or 28, wherein the colorable or transparent elastomeric composition is cured.

36. The colorable or transparent elastomeric composition of claim 27, wherein the ChromaMeter L value is from 65 to 90.

37. The colorable or transparent elastomeric composition of claim 36, wherein the colorable or transparent elastomeric composition has a ChromaMeter b value of 40 or less.

38. The colorable or transparent elastomeric composition of claim 36, wherein the colorable or transparent elastomeric composition has a ChromaMeter b value of 35 or less.

39. The colorable or transparent elastomeric composition of claim 36, wherein the colorable or transparent elastomeric composition has a ChromaMeter b value of 30 or less.

40. A colorable or transparent elastomeric composition comprising:
   a) from 10 to 100 parts, per hundred parts rubber, of a terpolymer of isobutylene, para-alkylstyrene, and halogenated para-alkylstyrene, wherein the terpolymer has a Mooney viscosity of from 30 to 50;
   b) from 10 to 90 parts, per hundred parts rubber, of a compound selected from the group consisting of polybutadiene, high cis-polybutadiene, natural rubber, polyisoprene, styrene-butadiene rubber, styrene-isoprene-butadiene rubber, isoprene-butadiene rubber, ethylene-propylene diene rubber, and blends thereof;
   c) from 30 to 80 parts of a non-black filler, and
   d) a polybutene processing aid;
      wherein the colorable or transparent elastomeric composition has a ChromaMeter L value of greater than 55.

41. The colorable or transparent elastomeric composition of claim 40, wherein the para-alkylstyrene is para-methylstyrene; the halogenated para-alkylstyrene is bromo para-methylstyrene; and the non-black filler is silica.

42. The colorable or transparent elastomeric composition of claim 41, wherein the silica is precipitated silica.

43. The colorable or transparent elastomeric composition of claim 40 or 41, wherein the colorable or transparent elastomeric composition further comprises from 2 to 20 weight percent of an organosilane-coupling agent, based on the weight of the non-black filler.

44. The colorable or transparent elastomeric composition of claim 43, wherein the colorable or transparent elastomeric composition comprises from 2 to 15 weight percent of the organosilane-coupling agent, based on the weight of the non-black filler.

45. The colorable or transparent elastomeric composition of claim 43, wherein the organosilane-coupling agent is selected from the group consisting of vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane, and mixtures thereof.

46. The colorable or transparent elastomeric composition of claim 43, wherein the organosilane-coupling agent is bis(3-(triethoxysilyl)-propyl)-tetrasulfane.

47. The colorable or transparent elastomeric composition of claim 40 or 41, wherein the colorable or transparent elastomeric composition is covulcanized.

48. The colorable or transparent elastomeric composition of claim 40 or 41, wherein the colorable or transparent elastomeric composition is cured.

49. The colorable or transparent elastomeric composition of claim 40, wherein the ChromaMeter L value is from 65 to 90.

50. The colorable or transparent elastomeric composition of claim 49, wherein the colorable or transparent elastomeric composition has a ChromaMeter b value of 40 or less.

51. The colorable or transparent elastomeric composition of claim 49, wherein the colorable or transparent elastomeric composition has a ChromaMeter b value of 35 or less.

52. The colorable or transparent elastomeric composition of claim 49, wherein the colorable or transparent elastomeric composition a ChromaMeter b value of 30 or less.

* * * * *